US012326223B2

(12) United States Patent
Raynor et al.

(10) Patent No.: US 12,326,223 B2
(45) Date of Patent: Jun. 10, 2025

(54) GETTER CARTRIDGE FOR TOXIC GASES INSIDE VALVES

(71) Applicant: Matheson Tri-Gas, Inc., Basking Ridge, NJ (US)

(72) Inventors: Mark Raynor, Longmont, CO (US); Rikard Wind, Johnstown, CO (US)

(73) Assignee: Matheson Tri-Gas, Inc., Basking Ridge, NJ (US)

( * ) Notice: Subject to any disclaimer, the term of this patent is extended or adjusted under 35 U.S.C. 154(b) by 634 days.

(21) Appl. No.: 17/654,952

(22) Filed: Mar. 15, 2022

(65) Prior Publication Data
US 2022/0299170 A1 Sep. 22, 2022

Related U.S. Application Data

(60) Provisional application No. 63/164,328, filed on Mar. 22, 2021.

(51) Int. Cl.
*F17C 13/04* (2006.01)
*B01J 19/00* (2006.01)
(Continued)

(52) U.S. Cl.
CPC ........... *F17C 13/04* (2013.01); *B01J 19/0073* (2013.01); *B01J 20/0222* (2013.01); *B01J 20/0237* (2013.01); *B01J 20/0248* (2013.01); *B01J 20/0277* (2013.01); *B01J 20/0281* (2013.01); *B01J 20/0285* (2013.01); *B01J 20/041* (2013.01); *B01J 20/043* (2013.01); *B01J 20/045* (2013.01); *B01J 20/08* (2013.01); *B01J 20/103* (2013.01); *B01J 20/18* (2013.01);
(Continued)

(58) Field of Classification Search
CPC .......... B01J 19/0073; B01J 2219/00256; B01J 20/20; B01J 20/226; B01J 2220/62; B01J 20/0222; B01J 20/0237; B01J 20/0248; B01J 20/0277; B01J 20/0281; B01J 20/0285; B01J 20/041; B01J 20/043; B01J 20/045; B01J 20/08; B01J 20/103; B01J 20/18; F17C 13/04; F17C 11/00; F17C 11/005; F17C 11/007; F17C 2205/0323; F17C 2205/00341; F17C 2205/0394; F17C 2205/0382
See application file for complete search history.

(56) References Cited

U.S. PATENT DOCUMENTS

| | | | | |
|---|---|---|---|---|
| 2,728,407 A * | 12/1955 | Squier | ..................... | B01D 53/26 55/516 |
| 7,632,342 B2 * | 12/2009 | Nakanoya | ................ | F17C 13/06 55/385.4 |

FOREIGN PATENT DOCUMENTS

| | | | | |
|---|---|---|---|---|
| DE | 29918320 U1 * | 1/2000 | ............. | F16K 1/307 |

OTHER PUBLICATIONS

Machine Translation of DE 29918320 (Year: 2000).*

* cited by examiner

*Primary Examiner* — Lessanework Seifu

(57) ABSTRACT

The present invention relates to cylinder packages utilized in the delivery of highly toxic and/or flammable compounds to semiconductor manufacturers. More specifically, the present invention provides a cartridge adapted to removably attach to the gas outlet of a gas discharge passageway in a cylinder valve provided on a toxic gas containing cylinder package, the cartridge comprising a cylindrically shaped housing having at least one end fitted with a barrier member permeable to the toxic gas contained within the cylinder package and the housing containing a toxic-gas getter material.

17 Claims, 6 Drawing Sheets

(51) Int. Cl.
*B01J 20/02* (2006.01)
*B01J 20/04* (2006.01)
*B01J 20/08* (2006.01)
*B01J 20/10* (2006.01)
*B01J 20/18* (2006.01)
*B01J 20/20* (2006.01)
*B01J 20/22* (2006.01)
*B01J 20/28* (2006.01)
*F16K 24/04* (2006.01)
*F17C 11/00* (2006.01)

(52) U.S. Cl.
CPC ............. *B01J 20/20* (2013.01); *B01J 20/226* (2013.01); *B01J 20/28052* (2013.01); *F16K 24/04* (2013.01); *F17C 11/00* (2013.01); *B01J 2219/00256* (2013.01); *F17C 2205/0323* (2013.01); *F17C 2205/0341* (2013.01); *F17C 2205/0394* (2013.01)

GETTER CARTRIDGE FOR TOXIC GASES INSIDE VALVES

CROSS REFERENCE TO OTHER APPLICATIONS

This application claims benefit of priority to U.S. Provisional Application No. 63/164,328, filed Mar. 22, 2021, the disclosure of which is fully incorporated herein by reference.

BACKGROUND OF THE INVENTION

1. Field of the Invention

The present invention relates to cylinder packages utilized in the delivery of highly toxic and/or flammable compounds to semiconductor manufacturers. More specifically, the present invention provides a cartridge adapted to removably attach to the gas outlet of a gas discharge passageway in a cylinder valve provided on a toxic gas containing cylinder package, the cartridge comprising a cylindrically shaped housing having at least one end fitted with a barrier member permeable to the toxic gas contained within the cylinder package and the housing containing a toxic-gas getter material.

2. Description of the State of the Art

Industrial processing and manufacturing applications requires the safe storage and handling of highly toxic or flammable gases. The semiconductor industry in particular relies on compressed gases such as silane ($SiH_4$), germane (GeH4) and carbon monoxide (CO) and liquefied compressed gases such as arsine ($AsH_3$), phosphine ($PH_3$), boron trifluoride ($BF_3$), and nitrogen trifluoride ($NF_3$) for wafer processing. Gaseous mixtures such as percent diborane/balance hydrogen ($B_2H_6/H_2$) and percent phosphine/balance hydrogen ($PH_3/H_2$) mixtures are also commonly used in the microelectronics industry.

Typically, a toxic gas is filled or charged into a cylinder prior to shipment. The cylinder package comprises a steel or aluminum cylinder or bottle having an internally threaded opening formed in the top wall to which a cylinder valve having a threaded valve body is mounted by threadedly engaging the external thread of the valve body with the internal thread of the opening. Cylinder valves typically have two ports, a port used to fill or discharge gas from the cylinder and a port fitted with safety relief device that will discharge the contents of the cylinder in the event of an emergency. For many, but not all, cylinder valves used in toxic gas the latter port is sealed and gas may only enter or leave the cylinder from the fill/discharge port. Both ports are operably in fluid communication with the interior of the cylinder. The cylinder package is charged with the desired gas via the fill/discharge port, the cylinder valve is closed and the port outlet is then typically cycle-purged with an inert gas such as nitrogen to remove the toxic gas in the valve cavity and finally sealed with an end cap to prevent the contained toxic gas from exiting the cylinder in the event that the valve is inadvertently opened or there is a leak across the valve seat. As a safety measure, cylinder valves used in toxic gas service also have a location in the throat of the valve port that can house a restrictive flow orifice (RFO). RFOs are available with different orifice diameters and can be threaded and sealed into the valve outlet throat to restrict the flow of toxic gas from the valve in the event that the valve is inadvertently opened. As a practical matter however, even with efficient cycle purging, it is difficult to keep all traces of the toxic gas from accessing the internal spaces of the cylinder valve which may then be inadvertently released upon removal of the discharge end cap. Further, since some gases such as arsine are toxic at concentrations of tens of parts per billion, any build-up of even traces of toxic gas in the valve outlet cavity as a result of minute across-the-seat leaks or as a result of outgassing from the cylinder valve polymer seat or other material in the valve during storage, is highly undesirable.

There thus remains a need for removing traces of toxic gases that may build up within the internal space (outlet cavity) of a cylinder valve prior to and during shipment and storage of the cylinder package.

BRIEF SUMMARY OF THE INVENTION

To this end, the present invention provides a getter cartridge adapted to be removably inserted into the throat of a valve port or gas discharge passageway of a cylinder valve in fluid communication with a toxic or flammable gas stored in a cylinder, said getter cartridge comprising a bottom and top wall, a peripheral wall extending from the bottom wall to the top wall, a washer located on said peripheral wall for protecting and positioning the getter cartridge within the gas discharge passageway, said washer being made of a material which does not chemically react with the toxic or flammable gas contained in the cylinder to degrade the sealing property of the washer, a barrier member permeable to the toxic or flammable gas positioned in the bottom wall, and a toxic or flammable-gas absorbing means contained inside of said cartridge, said toxic or flammable-gas absorbing means being exposed to said gas discharge passageway.

According to the present invention, it is preferred that the outer diameter of the getter cartridge is formed to accommodate the specific throat of the valve port that it is inserted into, the toxic-gas absorbing means being disposed in the getter cartridge comprising a toxic-gas absorbent made of a material which can chemically react with the toxic and/or flammable gas to take and consume the gas to thereby produce a solid reactant product, and a barrier member of a material which is permeable to the toxic gas and impermeable to the toxic-gas absorbent and the solid product, the barrier member being disposed in the on the bottom wall of the getter cartridge and adjacent to the toxic-gas absorbent.

It is also preferred that the toxic/flammable-gas absorbent includes a main reacting component. There are a number of toxic/flammable-gas absorbent materials available that may be of use in the present invention such as, but not limited to metals, such as copper, aluminum, manganese, sodium, calcium, magnesium, potassium and their respective groups such as oxides, hydroxides, carbonates, sulfates, sulfides, amides, permanganates and combinations thereof. The absorbent may be also be made up of the above materials dispersed on a high surface area adsorbent such as an alumina, silica, zirconia, molecular sieve, zeolite, carbon material, or metal organic framework.

Additional embodiments and features are set forth in the description that follows, and in part will become apparent to those skilled in the art upon examination of the specification or may be learned by the practice of the disclosed embodiments. The features and advantages of the disclosed embodiments may be realized and attained by means of the instrumentalities, combinations, and methods described in the specification.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention.

DETAILED DESCRIPTION OF THE INVENTION

Figure 2:
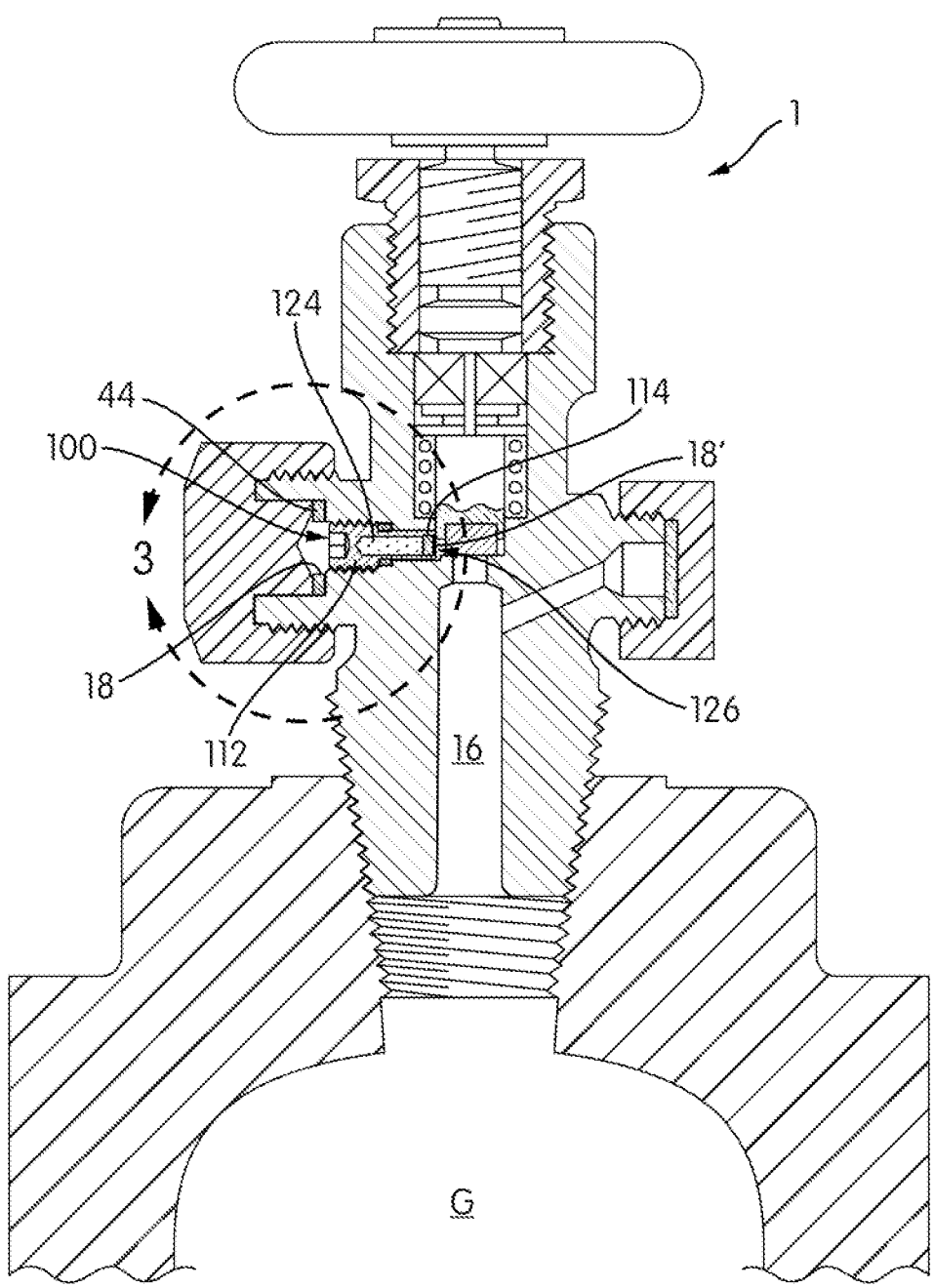
FIG. 2 is a partially enlarged cross-sectional view of a cylinder package to which a getter cartridge according to one embodiment of the present invention is installed within the gas discharge passageway of a cylinder valve.
Figure 3:
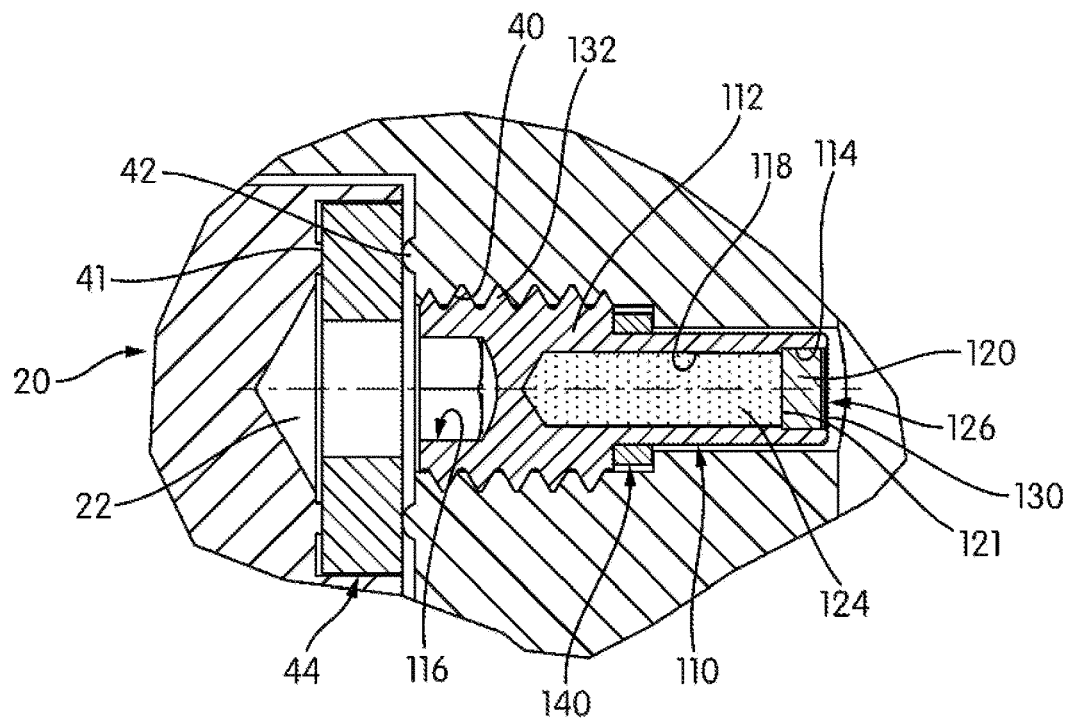
FIG. 3 is an enlarged, detailed view of the getter cartridge positioned within the gas discharge passageway shown in FIG. 2 indicated by dashed lines according to the present invention.
Figure 4:
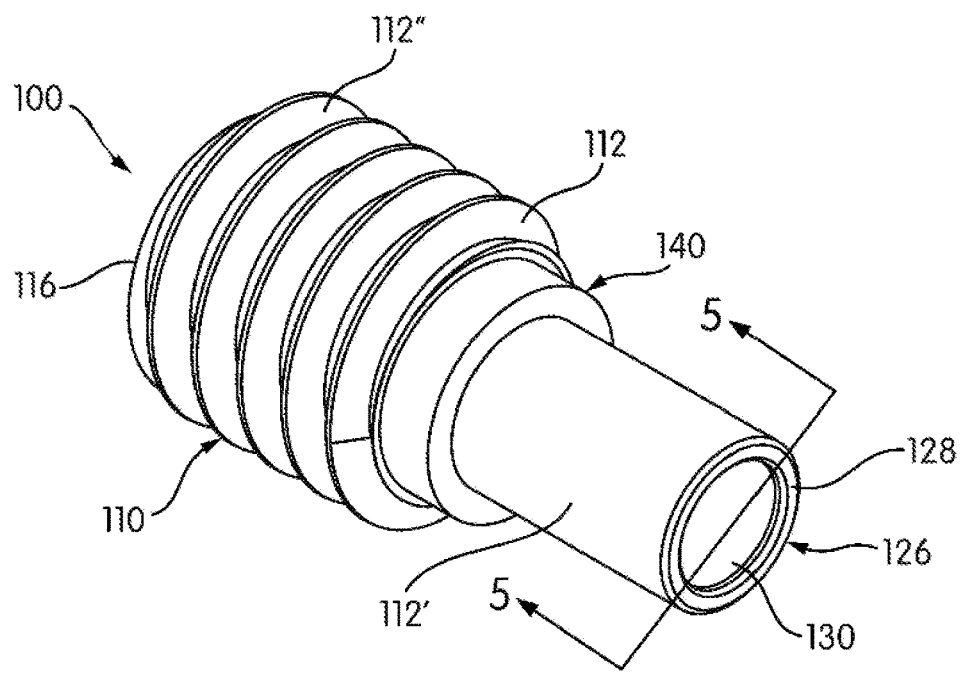
FIG. 4 is a perspective view of the getter cartridge of the present invention.
Figure 5:
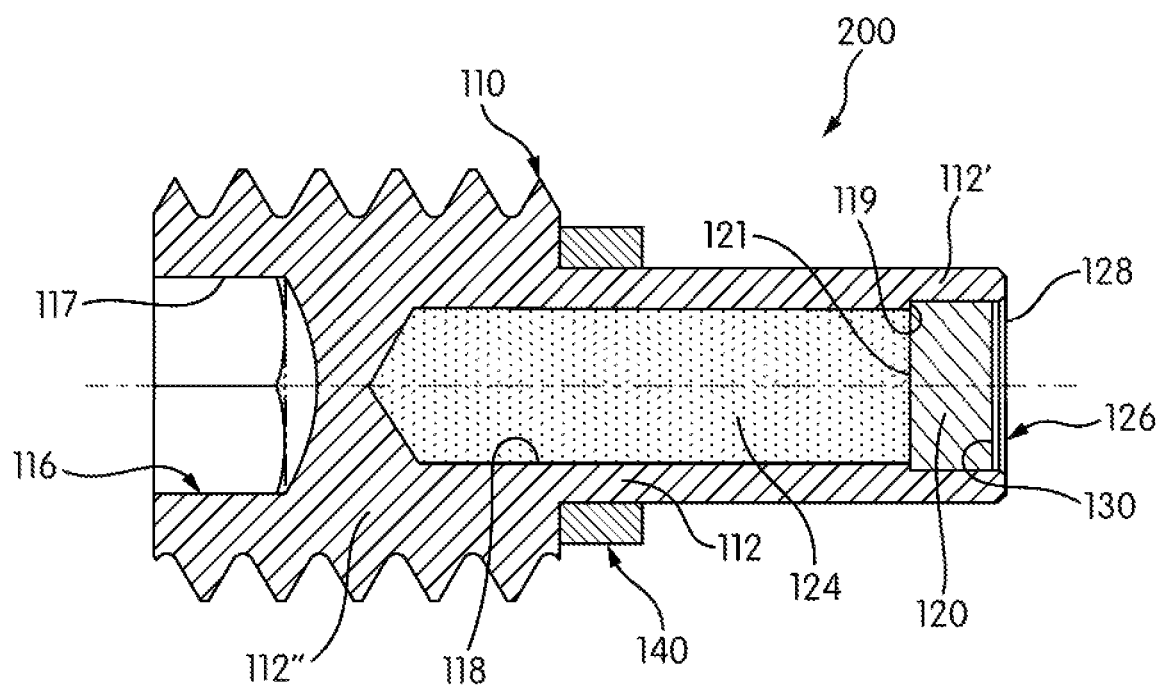
FIG. 5 is a cross-sectional view of the getter cartridge present invention taken along the line 5-5 of FIG. 4.
Figure 6:
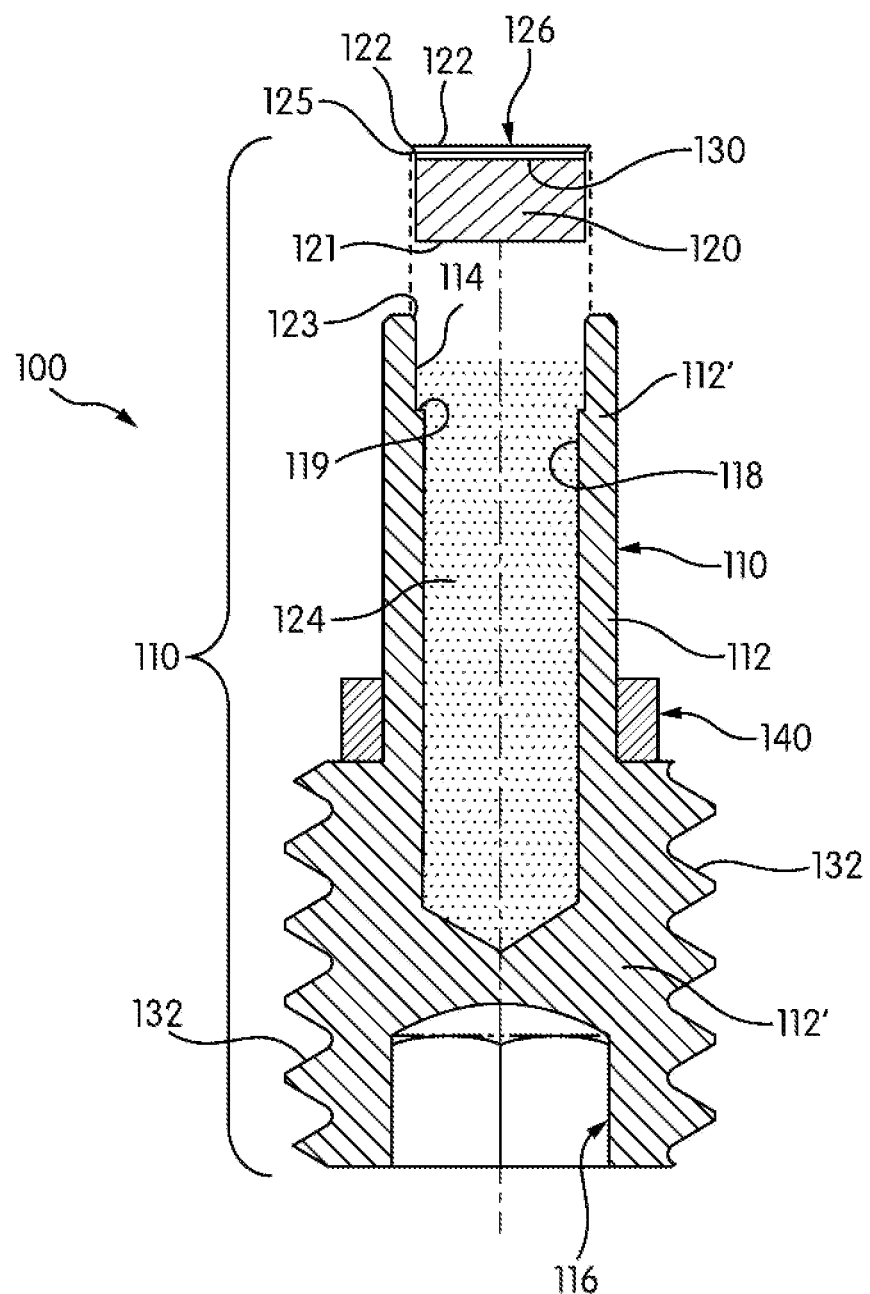
FIG. 6 is an exploded side elevation view of the getter cartridge of the present invention.

The getter cartridge 100, according to this invention, is best shown in FIG. 4 and can be seen, in FIGS. 2 and 3, as mounted within the gas discharge passageway 18 of a cylinder valve neck 12. The cartridge 100 comprises a housing 110, which comprises a housing body 112, a housing open end 114, and a housing closed top 116. The housing body 112 is a generally cylindrical casing having an outside diameter and an inside diameter and a hollow center core 118 extending through the open end 114 along the longitudinal axis of housing body 112 that receives and secures a toxic/flammable-gas absorbent 124. Preferably housing body 112 is constructed from a metal such as stainless steel, aluminum, monel, hastelloy, and brass or a polymer material such as polypropylene, polyimide, poly (ether ether ketone), PTFE, PFA fluorocarbon or an ABS material or some other material that does not chemically react with the toxic and/or flammable gas that will come in contact with cartridge 100. Essentially, getter cartridge 100 is assembled, as best seen in FIGS. 5 and 6, by introducing toxic/flammable-gas absorbent 124 into the hollow center core 118 of housing body 112 and then inserting the positioning ring 120 of end cap 126 into the open end 114 of housing body 112.

Figure 1:
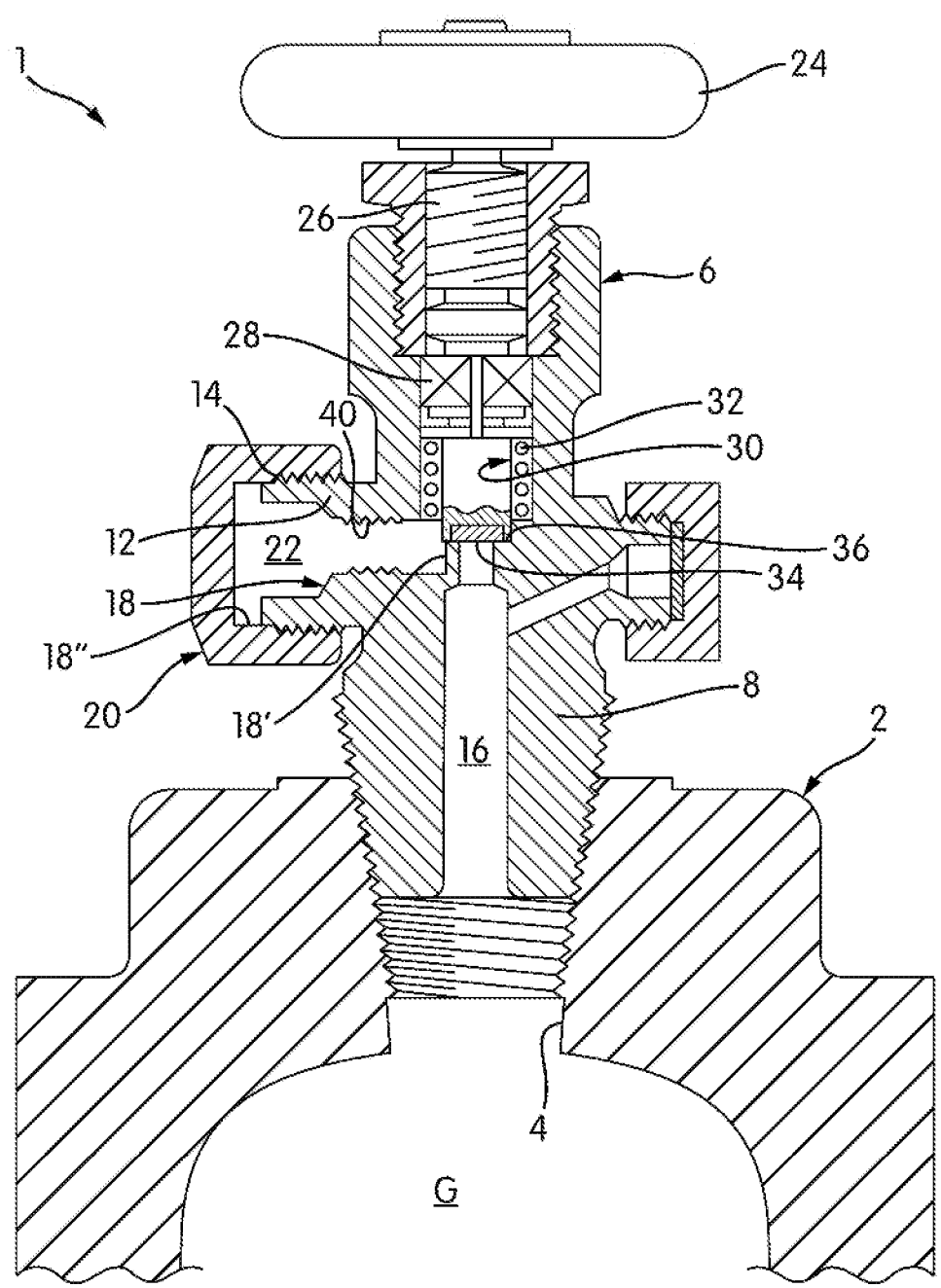
FIG. 1 is a partially enlarged cross-sectional view of a cylinder package having a gas discharge passageway which accommodates a getter cartridge according to one embodiment of the present invention.

Referring to FIG. 1, there is shown a portion of a cylinder package 1 for containing and delivering a toxic/flammable gas G comprising a gas cylinder or bottle 2 in fluid communication with cylinder valve 6. The gas cylinder 2 is adapted to contain various toxic and/or flammable gases such as arsine, phosphine, boron trifluoride, nitrogen trifluoride, diborane, germane, silane, disilane, trisilane, dichlorosilane, monochlorosilane, trichlorosilane, tetrachlorosilane, hexachlorodisilane, tetrafluorosilane, boron tribromide, ammonia, tungsten hexafluoride, titanium tetrachloride, sulfur hexafluoride, carbonyl sulfide, digermane, hydrazine, hydrogen selenide, hydrogen sulfide, hydrogen chloride, hydrogen bromide, hydrogen fluoride, chlorine, fluorine, boron trichloride, carbon monoxide, sulfur dioxide, ozone, phosgene, including mixtures of these gases with hydrogen, nitrogen or inert balance gases. The gas cylinder 2 is provided with an internally threaded opening 4 formed in the top wall thereof.

The cylinder valve 6 comprises a valve body 8, the lower portion of which is externally threaded. The valve body 8 can be mounted on the gas cylinder 2 by threadedly engaging the external thread of the valve body 8 with the internal threads of the opening 4.

The valve body 8 also includes an axial or vertical passageway 16 formed therethrough, which may extend from the top portion to the lower portion of the valve body 8. This vertical passageway 16 is in communication with the interior of the gas cylinder 2 when the valve body 8 is attached to the opening 4 of the gas cylinder 2.

The cylinder valve 6 further includes a handle 24. The handle 24 comprises a rotating member 26 that abuts against the sealing member 28 of the seat assembly 30 and moves the whole seat assembly 30 downward against the biasing force of the coil spring 32 until the shutoff member 34 seats on the shoulder 36 to close the top opening of the upper portion of passageway 16.

The valve body 8 has a cylinder valve neck 12 which extends outwardly therefrom to define a peripheral wall for the horizontal gas discharge passageway 18. The cylinder valve neck 12 includes an external thread formed thereon at the outer end 14 thereof so that the dust cap 20 can be attached to the cylinder valve 6. The inner end 18' of the horizontal gas discharge passageway 18 is located to communicate with the vertical passageway 16 while the outer end of the horizontal gas discharge passageway 18 is opened at the outer end 14 of the valve body 8 to define a gas outlet 18".

As shown in FIG. 1 when the cylinder valve 6 is in the off position, that is, the vertical passageway 16 is not in fluid communication with the horizontal gas discharge passageway 18 and dust cap 20 is secured to outer end 14 of cylinder valve neck 12, a void or chamber 22 is formed. Leakage and/or outgassing of toxic and/or flammable gases will collect in this void 22 which poses a hazard for the end user when removing dust cap 20. Also, if the gas is corrosive, and especially if there is moisture present, it can lead to corrosion and particle formation. Typically, cylinder valves for use with toxic and/or flammable gases have internal threads 40 located at the inner end of most horizontal gas discharge passageway 18 for mounting a restricted flow orifice (RFO). The present invention contemplates the temporary removal and replacement of the RFO with the getter cartridge 100 of the present invention thereby allowing for the absorption or reacting away of small amounts of toxic and/or flammable gas that result from residual outgassing from the inner peripheral wall of the horizontal gas discharge passageway 18 as well as across the polymer seat (not shown) formed by shutoff member 34.

In FIG. 2, the getter cartridge 100 of the present invention is shown installed in the cylinder valve 6 of a cylinder package 1. In this embodiment, toxic/flammable gas G outgassing from the vertical passageway 16 across the polymer seat (not shown) formed by shutoff member 34 into to the inner end 18' of most horizontal gas discharge passageway 18 is channeled through the permeable end cap 126 of getter cartridge 100 into the open end 114 of housing body 112 where it either reacts with or is absorbed by the toxic/flammable-gas absorbent 124. There are a number of toxic/flammable-gas absorbent materials available that may be of use in the present invention such as, but not limited to metals, such as copper, aluminum, manganese, sodium, magnesium, potassium and their respective groups such as oxides, hydroxides, carbonates, sulfates, sulfides, amides, permanganates and combinations thereof. These materials may also be present on a high surface area adsorbent such as alumina, silica, carbon, molecular sieve, zeolite or metal organic framework.

Referring now to FIGS. 3, 4 and 5, the cartridge 100 is preferably, but not necessarily molded from a unitary piece of rigid plastic material such as but not limited to polypropylene, polyimide, poly (ether ether ketone), PTFE, PFA fluorocarbon or an ABS that does not chemically react with the toxic and/or flammable gas that it will necessarily come in contact with. Alternatively, cartridge 100 could also be made from a metal such as stainless steel, aluminum or brass, monel, hastelloy, depending on the gas contemplated for use. The getter cartridge 100 comprises a housing 110, which comprises a housing body 112, a housing open end 114 and a housing closed top end 116. The housing body 112 is a generally cylindrical casing having an outside diameter and an inside diameter and a hollow center core 118 that receives and secures a toxic/flammable-gas absorbent 124. Preferably housing body 112 will have distal and proximal ends, 112' and 112", respectively, wherein the outer diameter of the distal end 112' is less than outer diameter of the proximal end 112" which results in the formation of an annular seating surface or shoulder 138 extending radially outward from the sidewall of the distal end 112' to the sidewall forming the proximal end 112" for receiving washer 140. The purpose of washer 140 is to provide protection to the getter cartridge as well as the gas discharge pathway consequently washer 140 may or may not be present. Washer 140 may be made of such a material that does not chemically react with the toxic and/or flammable gas contained in the cylinder 2, and particularly of such a material that will not chemically react with the toxic and/or flammable gas to degrade washer 140. Depending on the toxic and/or flammable gas G contained in the cylinder 2, the material of the washer 140 may be selected from the group of polymer resins such as but not limited to vinyl chloride, tetrafluoride, trifluoride, Viton®, Kalrez®, and PTFE, and various metals.

Referring now to FIG. 6 the housing open end 114 preferably has an inner diameter that is slightly larger than the inner diameter of the hollow center core 118 which results in the formation of a seating surface 119 which supports the positioning ring 120 of end cap 126. End cap 126 includes a through-hole centrally formed therein forming an annular rim top surface 128 allowing for a barrier member 130 which is permeable to the toxic and/or flammable gas G and impermeable to the toxic/flammable-gas absorbent 124 and the solid product produced by the toxic/flammable-gas absorbent 124 to be positioned therein. It is preferred that the barrier member 130 has some degrees of strength. For example, the barrier member may be preferably formed by a sintered plate of porous stainless steel. Positioning ring 120 is preferably perfectly-matched with the interior surface of housing open end 114, so that these two surfaces become sealing surfaces which mate to form a reliable seal. Also, optional attachment means may be added, such as the outer flange 122 edge snapping into a recess 123 in the upper surface of housing open end 114 to further secure to end cap 126 or end cap 126 may be positioned with the use of a retaining ring (not shown). In the alternative, external threads (not shown) could be positioned around the edge of flange positioning ring 120. Then end cap 126 could be removably attached by screwing the external threaded portion of edge 120 into an internally threaded opening (not shown) in the housing end 114. In yet another embodiment it is contemplated that upon filling the cartridge with the absorbent material 124 a press may be used to simply push/deform the barrier member 130 into open end 114, if the cartridge is made out of a softer material, such as aluminum (or vice versa) and thus an end cap would not be necessary as barrier member 130 would serve that function.

To complete the assembly of getter cartridge 100, as best seen in FIGS. 5 and 6, toxic/flammable-gas absorbent 124 is first introduced into the hollow center core 118 of housing body 112. Followed by the insertion of the positioning ring 120 of end cap 126 into the open end 114 of housing body 112 until the leading edge 121 of positioning ring 120 is seated on seating surface 119 and the lower surface 125 of cap flange 122 comes in contact with the recess 123 of open end 114. An adhesive such as a hot melt may further be applied to the recess 123 so that when the lower surface 125 of cap flange 122 comes in contact, a seal is formed, thereby further securing the end cap 126 in place.

The preferred getter cartridge housing 110 will have a sealing member, such as external threads 132 positioned around the exterior surface of proximal end 112" thereby allowing the cartridge 100 to be removably positioned by mating with the internal threads 40 of the horizontal gas discharge passageway 18. However, in instances where internal threads are not available in the horizontal gas discharge passageway 18, an optional attachment means may be added, such as positioning O-rings (not shown) around the exterior surface of proximal end 112" instead of threads. In the alternative, thermoplastic ribs may be co-molded into the exterior surface of proximal end 112" making the use of O-rings unnecessary. Alternatively, ribs may be cut or molded into a metallic proximal end 112".

Figure 7:
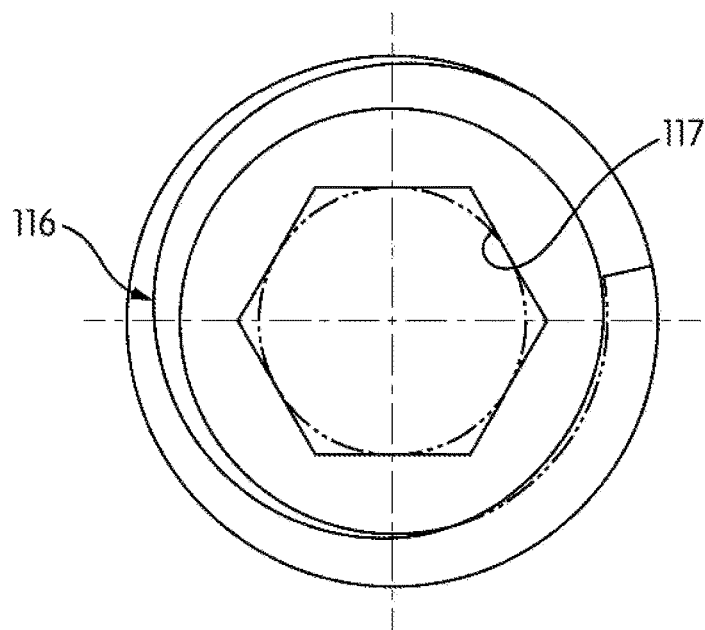
FIG. 7 is a top plan view of the getter cartridge of the present invention.

As discussed previously housing body 110 is molded or machined as a unitary piece and the housing closed top 116 is molded with either a 4-, 6-, or 12-point socket 117, as shown in FIG. 7 formed therein to accommodate a key, such as a hex key, for insertion and removal of the getter cartridge 100. Alternatively, the housing closed top 116 is molded to accommodate a phillips-head screwdriver, flat head screwdriver, or some other means for securing and removing the getter cartridge 100 in the throat of the gas discharge passageway 18. Once getter cartridge 100 is secured into the horizontal gas discharge pathway 18 a Diameter Index Safety Standard (DISS) gasket 44 may be placed over the top of the cartridge 100, coming in contact with toroid 42 and as the dust cap 20, which also comprises a toroid 41 is the secured into place and DISS gasket 44 is indented by toroids 41 and 42 forming face seals.

Figure 8:
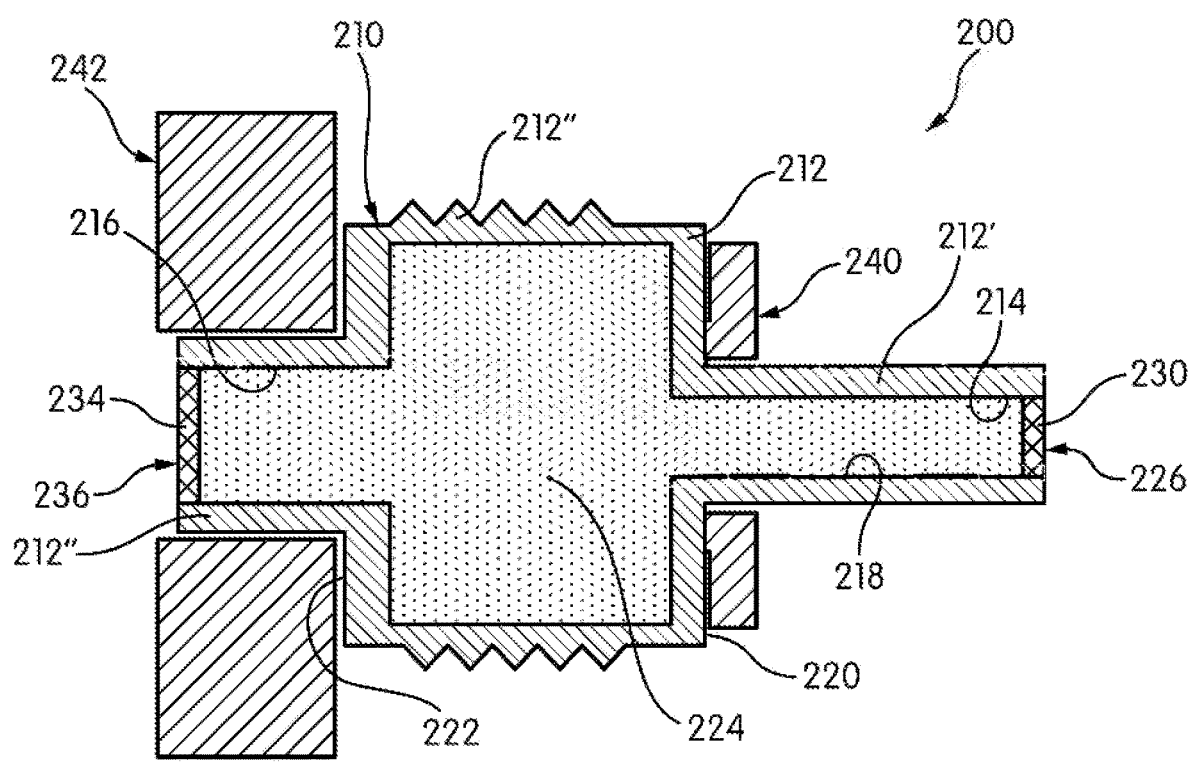
FIG. 8 is another cross-sectional view showing an additional embodiment of the present invention.

In an alternate embodiment, as shown in FIG. 8, getter cartridge 200 has a housing 210 which comprises a housing body or sleeve 213 having a generally cylindrical casing having an outside diameter and an inside diameter and an axial bore or sleeve bore 218 extending therethrough forming an open distal end 214 and an open proximal end 216 for receiving an end cap 226 and top cap 236, respectively thereby closing off sleeve bore 218. Preferably housing body 213 will have a central portion 212 flanked by distal and proximal ends, 212' and 212", respectively, wherein the outer diameter of the distal and proximal ends, 212' and 212", respectively are less than outer diameter of the central portion 212 which results in the formation of two annular seating surfaces or shoulders 220 and 222 extending radially outward from the sidewalls of the distal and proximal ends, 212' and 212", respectively, to the sidewall forming the central portion 212. Shoulder 220 receives washer 240, and shoulder 222 receives a DISS gasket 242, which is connected to the dust cap, as discussed previously toroids (not shown) form sealing faces as the dust cap is tightened into position. The housing open distal end 214 and open proximal end 216 preferably have an inner diameter that is slightly larger than the inner diameter of the axial bore 218 which results in the formation of a seating surface (not shown) in both ends which supports the positioning ring (not shown) of end cap 226 and top cap 236. End cap 226 and top cap 236 both comprise an axial bore forming an annular rim top surface allowing for a barrier member 230 and 234, respectively, which is permeable to the toxic and/or flammable gas and impermeable to the toxic/flammable-gas absorbent 224 and the solid product produced by the toxic/flammable-gas absorbent 224 to be positioned therein. There are a number of toxic/flammable-gas absorbent materials available that may be of use in the present invention such as, but not limited to metals, such as copper, aluminum, manganese, sodium, calcium, magnesium, potassium and their respective groups such as oxides, hydroxides, carbonates, sulfates, sulfides, amides, permanganates and combinations thereof. These materials may also be present on a high surface area adsorbent such as alumina, silica, carbon, molecular sieve, zeolite or metal organic framework. It is preferred that the barrier members 230 and 234 have some degrees of strength. For example, the barrier member may be preferably formed by a sintered plate of stainless steel. After filling the cartridge with the absorbent material 224 a press may be used to simply push/deform the barrier members 230 and 234 into the cartridge body, if the cartridge is made out of a softer material, such as aluminum (or vice versa). Positioning rings of end cap 226 and top cap 236 are preferably perfectly-matched with the interior surface of the housing open distal end 214 and open proximal end 216, respectively so that these two surfaces become sealing surfaces which mate to form a reliable seal. Also, optional attachment means may be added, such as the outer flange (not shown) edge snapping into a recess in the flange upper surface (not shown) of housing body 213 to further secure to end cap 226 and top cap 236. In the alternative, external threads (not shown) could be positioned around the edge of flange positioning ring. Then end cap 226 and top cap 236 could be removably attached by screwing the external threaded portion of the positioning ring into an internally threaded opening (not shown) in the housing open distal end 214 and open proximal end 216.

The distal end 212" can be cylindrical in shape; however, it may be advantageous to square off the sides so that a socket or wrench can be used to screw getter cartridge 200 securely into place.

Operation of the getter cartridge 100 will be described below. With the cylinder valve 6 being in its shutoff position, the getter cartridge 100 of the present invention is secured into the horizontal gas discharge passageway 18 and the dust cap 20 is securely positioned on the cylinder valve neck 12 forming void 22. Toxic and/or flammable gas temporarily having been adsorbed by the inner peripheral wall of the horizontal gas discharge passageway 18, will form in void 22 through the gradual outgassing from the inner peripheral wall of the horizontal gas discharge passageway 18 as well as across the polymer seat from vertical passageway 16. The toxic and/or flammable gas permeates through the barrier member 130 of the outlet cap 126 to the toxic/flammable-gas absorbent 124. The toxic/flammable-gas absorbent 124 then absorbs the toxic and/or flammable gas, thereby resulting in the formation of a solid product. The solid product cannot move through the barrier member 130. Consequently, the toxic gas will not diffuse externally from the cylinder valve 6 even when the dust cap 20 is removed from the cylinder valve 6.

Further, the toxic/flammable-gas absorbent 124 in the aforementioned embodiment may include a material that can absorb at least moisture and preferably the toxic gas and/or flammable gas in addition to the moisture, such as molecular sieve, zeolite, alumina or activated charcoal. This example is advantageous in that the toxic/flammable-gas absorbent 124 can hold water produced by its reaction with the toxic gas. Further, the toxic/flammable-gas absorbent 124 for absorbing the toxic and/or flammable gas by the chemical reaction as in the aforementioned embodiment may be replaced, for example, by a toxic/flammable-gas adsorbent formed of a material which can absorb at least the toxic and/or flammable gas and preferably moisture in addition to the toxic gas, such as molecular sieve, zeolite, alumina or active carbon. The toxic-gas adsorbent made of any one of the listed materials is particularly preferred since it can absorb not only the toxic and/or flammable gas, but also any moisture contained in the air within the gas discharge passageway. The moisture contained in the air within the horizontal gas discharge passageway 18 may corrode the metallic surface of the horizontal gas discharge passageway 18 to produce a corrosion reactant which may in turn degrade the purity of toxic and/or flammable gas when the toxic and/or flammable gas is used.

The foregoing description is considered as illustrative only of the principles of the invention. The words "comprise," "comprising," "include," "including," and "includes" when used in this specification and in the following claims are intended to specify the presence of one or more stated features, integers, components, or steps, but they do not preclude the presence or addition of one or more other features, integers, components, steps, or groups thereof. Furthermore, since a number of modifications and changes will readily occur to those skilled in the art, it is not desired to limit the invention to the exact construction and process shown described above. Accordingly, all suitable modifications and equivalents may be resorted to falling within the scope of the invention as defined by the claims which follow.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, materials and methods according to some embodiments are described herein. While the invention has been described in detail herein in accord with certain preferred embodiments thereof, many modifications and changes therein may be effected by those skilled in the art. Without further elaboration it is believed that one skilled in the art can, using the description set forth above, utilize the invention to its fullest extent.

Having disclosed several embodiments, it will be recognized by those of skill in the art that various modifications, alternative constructions, and equivalents may be used without departing from the spirit of the disclosed embodiments. Additionally, a number of well-known processes and elements have not been described in order to avoid unnecessarily obscuring the present invention. Accordingly, the above description should not be taken as limiting the scope of the invention.

As used herein and in the appended claims, the singular forms "a", "an", and "the" include plural referents unless the context clearly dictates otherwise.

What is claimed is:

1. A getter cartridge for operatively coupling to a threaded gas discharge passageway of a cylinder valve installed on a cylinder package containing a toxic and/or flammable gas, the getter cartridge comprising: a cartridge housing body having an distal end, a closed proximal top end, and a center core extending along a housing longitudinal axis through the open distal end; an absorbing means contained within said cartridge housing body between said open distal end and said closed proximal top end; an end cap having a through-hole centrally formed therein covering said open distal end of said center core of said cartridge housing; a positioning ring extending from said end cap, said positioning ring is configured to be received by said open distal end; a barrier member positioned within said centrally formed through-hole which is permeable to said gas, and in fluid communication with said absorbing means; and a sealing member positioned on the outer surface of said closed proximal top end comprising threads configured to mate with the threads positioned within said gas discharge passageway thereby forming a seal when said getter cartridge is installed in the cylinder valve.

2. The apparatus of claim 1, wherein said absorbing means consisting of a gas absorbent material which chemically reacts with the gas to consume said gas to thereby produce a solid reactant product that is impermeable to said barrier member which is permeable to said gas and impermeable to the toxic-gas absorbent and solid reactant produced.

3. The apparatus of claim 2, wherein said gas absorbent comprises a metal selected from the group consisting of copper, aluminum, manganese, sodium, calcium, magnesium, potassium and their respective oxides, hydroxides, carbonates, sulfates, sulfides, amides permanganates and combinations thereof.

4. The apparatus of claim 3, wherein said gas absorbent further includes a high surface area adsorbent selected from the group consisting of alumina, silica, carbon, molecular sieve, zeolite or metal organic framework for retaining said metals.

5. The apparatus of claim 1, wherein a socket is formed within said closed proximal top end for engaging a wrench.

6. The apparatus of claim 1, wherein said absorbing means consisting of a gas absorbent material which absorbs the gas.

7. The apparatus of claim 1, wherein said open distal end has a smaller diameter than the diameter of said closed proximal top end which results in the formation of an annular seating surface extending radially outward for accepting a washer that seats the getter cartridge within said gas discharge passageway.

8. A getter cartridge for operatively coupling to a gas discharge passageway of a cylinder valve installed on a cylinder package containing a toxic/flammable gas, the getter cartridge comprising: a cartridge housing having a central portion flanked by a first end and a second end forming a longitudinal axis and a centrally formed bore extending along said longitudinal axis through said first end, central portion, and said second end, wherein the outer diameter of both said first end and said second end is less than the outer diameter of said central portion, wherein said central portion comprises threads positioned on the outer surface that mate with the threads positioned within said gas discharge passageway to form a seal when said getter cartridge is installed in the cylinder valve; a filter media contained within said centrally formed bore between said first end, central portion, and said second end; a first end cap covering said first end of the cartridge housing; said first end cap having a through-hole centrally formed therein covering said first end of said cartridge housing; a first positioning ring extending from said first end cap, wherein said first positioning ring is configured to be received by said first end; a second end cap covering said second end of said cartridge housing; said second end cap having a through-hole centrally formed therein covering said second end of said cartridge housing; a second positioning ring extending from said second end cap, wherein said second positioning ring is configured to be received by said second end; and a barrier member positioned within said centrally formed through-holes of said first end cap and said second end cap which is permeable to the gas, and in fluid communication with said filter media.

9. The apparatus of claim 8, wherein said filter media consisting of a gas absorbent material which chemically reacts with and consumes said gas to thereby produce a solid reactant product that is impermeable to said barrier member which is permeable to said gas and impermeable to the toxic-gas absorbent and said solid reactant produced.

10. The apparatus of claim 9, wherein said gas absorbent material has a main reacting component comprising a metal selected from the group consisting of copper, aluminum, manganese, sodium, calcium, magnesium, potassium and their respective oxides, hydroxides, carbonates, sulfates, sulfides, amides, permanganates and combinations thereof.

11. The apparatus of claim 10, wherein said gas absorbent material further includes a high surface area adsorbent selected from the group consisting of alumina, silica, carbon, molecular sieve, zeolite or metal organic framework for retaining said metals.

12. A getter cartridge for operatively coupling to a gas discharge passageway of a cylinder valve installed on a cylinder package containing a toxic/flammable gas comprising: a cartridge housing body having an open end, a closed top end, and a center core extending along a housing longitudinal axis through the open end, wherein said closed end comprises threads positioned on the outer longitudinal surface of said closed top end that mate with the threaded gas discharge pathway of the cylinder valve to form a seal; a filter media contained within said cartridge housing body between said open end and said closed top end; an end cap having a through-hole centrally formed therein covering said open end of said cartridge housing; a positioning ring extending from said end cap, said positioning ring is configured to be received by said open end; and a barrier member positioned within said centrally formed hole which is permeable to a toxic and/or flammable gas, and in fluid communication with said filter media.

13. The apparatus of claim 12, wherein said filter media consists of a toxic and/or flammable gas absorbent material which chemically reacts with said toxic and/or flammable gas to consume said toxic and/or flammable gas to thereby produce a solid reactant product that is impermeable to said barrier member which is permeable to said toxic and/or flammable gas and impermeable to the toxic-gas absorbent and said solid reactant produced.

14. The apparatus of claim 13, wherein said toxic and/or flammable gas absorbent comprising a metal selected from the group consisting of copper, aluminum, manganese, sodium, calcium, magnesium, potassium and their respective oxides, hydroxides, carbonates, sulfates, sulfides, amides permanganates and combinations thereof.

15. The apparatus of claim 14, wherein said toxic and/or flammable gas absorbent further includes a high surface area adsorbent comprising alumina, silica, carbon, molecular sieve, zeolite or metal organic framework for retaining said metals.

16. The apparatus of claim 12, wherein a socket is formed within said closed top end for engaging a wrench.

17. The apparatus of claim 12, wherein said filter media consists of a toxic and/or flammable gas absorbent material which absorbs said toxic and/or flammable gas.

\* \* \* \* \*